United States Patent
Yin et al.

(10) Patent No.: US 12,211,177 B2
(45) Date of Patent: Jan. 28, 2025

(54) METHOD FOR CORRECTING ANOMALOUS PIXEL AND APPARATUS

(71) Applicant: SHANGHAI INTEGRATED CIRCUIT MANUFACTURING INNOVATION CENTER CO., LTD., Shanghai (CN)

(72) Inventors: Rui Yin, Shanghai (CN); Min Xu, Shanghai (CN); Wei Zhang, Shanghai (CN)

(73) Assignee: SHANGHAI INTEGRATED CIRCUIT MANUFACTURING INNOVATION CENTER CO., LTD., Shanghai (CN)

( * ) Notice: Subject to any disclaimer, the term of this patent is extended or adjusted under 35 U.S.C. 154(b) by 494 days.

(21) Appl. No.: 17/586,045

(22) Filed: Jan. 27, 2022

(65) Prior Publication Data

US 2022/0383462 A1    Dec. 1, 2022

(30) Foreign Application Priority Data

May 31, 2021   (CN) .......................... 202110596677.6

(51) Int. Cl.
*G06T 5/50* (2006.01)
*G01S 17/42* (2006.01)
*G01S 17/894* (2020.01)
*G06T 5/70* (2024.01)
*G06T 7/00* (2017.01)
(Continued)

(52) U.S. Cl.
CPC ................ *G06T 5/50* (2013.01); *G01S 17/42* (2013.01); *G01S 17/894* (2020.01); *G06T 5/70* (2024.01); *G06T 7/0002* (2013.01); *G06T 7/521* (2017.01); *G06T 7/85* (2017.01); *G06V 10/751* (2022.01); *H04N 23/90* (2023.01); *G06T 2207/10028* (2013.01); *G06T 2207/20192* (2013.01);
(Continued)

(58) Field of Classification Search
CPC ....... A61F 9/00; G01J 5/48; G01J 2005/0077; G01J 5/026; G01J 5/08; G01J 5/0896; G01M 11/0214; G01M 11/0278; G01M 11/0235
USPC ......................................................... 348/135
See application file for complete search history.

(56) References Cited

U.S. PATENT DOCUMENTS

2016/0295193 A1* 10/2016 Van Nieuwenhove ...................... H04N 13/257

FOREIGN PATENT DOCUMENTS

CN       111340721 B  *  2/2021
DE   102020207695 A1  *  12/2021

* cited by examiner

*Primary Examiner* — Masum Billah
(74) *Attorney, Agent, or Firm* — Ziegler IP Law Group LLC

(57) ABSTRACT

A method for correcting the anomalous pixel includes: calculating a matching index of pixels in a first point cloud map and a second point cloud map; finding out an anomalous pixel based on the matching index of the pixels and a correction threshold; and calculating a correction column difference, and correcting the anomalous pixel based on the correction column difference and the matching index of the pixels. The anomalous pixel in the point cloud map is retained and corrected, thus the pixel integrity of an image is guaranteed; and a mode for correcting the anomalous pixel is simple, requires fewer calculating steps, and exhibits high anomalous pixel correction efficiency. An apparatus for the same purpose includes a first camera, a second camera, (Continued)

an image processing unit, an indexing unit, a calculating unit, a judging unit, and a correction execution unit.

14 Claims, 4 Drawing Sheets

(51) Int. Cl.
  *G06T 7/521* (2017.01)
  *G06T 7/80* (2017.01)
  *G06V 10/75* (2022.01)
  *H04N 23/90* (2023.01)
(52) U.S. Cl.
  CPC ............... *G06T 2207/20224* (2013.01); *G06T 2207/30168* (2013.01)

METHOD FOR CORRECTING ANOMALOUS PIXEL AND APPARATUS

FIELD OF TECHNOLOGY

The present invention relates to the technical field of image processing, and in particular relates to a method for correcting an anomalous pixel, and an apparatus.

BACKGROUND

In a depth map measured by a TOF camera (Time of Flight Camera), there are often a large number of incorrect depth measurements at the edge of an object, and after being generated, 3D point clouds visually appear as invalid points flying in the air, referred to as flying-spot noise. Due to the flying-spot noise, the ToF camera cannot acquire 3D information at the edge of the object effectively, and wide popularization and application of the ToF camera may be affected if the flying-spot noise cannot be solved.

The traditional solution to flying-spot noise comprises firstly judging the flying-spot noise in an image by an algorithm, and then directly filtering the flying-spot noise, which, however, may reduce the pixel points of the image. There is hardware or software for correcting the pixel in the prior art, however, a judgment method of the anomalous pixel and a calculation mode for correction are complicated and relatively low in repair efficiency.

In the invention patent with the publication number CN111340721B, a pixel correction method, a device, an apparatus, and a readable storage medium are disclosed. For each to-be-corrected pixel set, a correction value of each to-be-corrected pixel is determined based on a maximum transition value and a cumulative distribution vector; due to the fact that the maximum transition value represents a correction range that each to-be-corrected pixel should be corrected on the basis of a reference value, and a cumulative distribution probability in the cumulative distribution vector represents a correction degree of each to-be-corrected pixel in the to-be-corrected pixel set, the correction value may guarantee the natural pixel transition in the to-be-corrected pixel set. Further, a correction proportion of the correction value is acquired, and the pixel is corrected based on the correction value and an original value at the same time, thus the edge in an image is eliminated, and natural pixel transition is achieved. The natural pixel transition is achieved by eliminating the edge in the image in the invention, however, an element in the image is reduced due to elimination of the edge of the image, if the edge of the image contains important pixels of the image, the elimination of the edge of the image may cause the image to be incomplete.

Hence, it is necessary to provide a method for correcting an anomalous pixel and an apparatus to solve the above problems in the prior art.

SUMMARY

An objective of the present invention is to provide a method for correcting an anomalous pixel and an apparatus to solve the problems of image pixel reduction, complex correction step, and low efficiency when the pixel noise is processed.

To achieve the objective, the method for correcting the anomalous pixel comprises steps of:

S1: calculating a matching index of pixels in a first point cloud map and a second point cloud map;

S2: finding an anomalous pixel based on the matching index of the pixels and a correction threshold; and S3: calculating a correction column difference, and correcting the anomalous pixel based on the correction column difference and the matching index of the pixels.

The method for correcting the anomalous pixel disclosed by the present invention has the beneficial effects that:

the matching index of the pixels in the first point cloud map and the second point cloud map is calculated; the anomalous pixel is found out based on the matching index of the pixels and the correction threshold; then the correction column difference is calculated, and the anomalous pixel is corrected based on the correction column difference and the matching index of the pixels, thus retaining the anomalous pixel in the point cloud map; the anomalous pixel is corrected to guarantee the pixel integrity of an image, and a mode for correcting the anomalous pixel is simple, requires fewer calculating step, and exhibits high anomalous pixel correction efficiency.

Preferably, in the step S1, the calculating a matching index of the pixels in a first point cloud map and a second point cloud map comprises steps of:

S10: obtaining a first depth map and a first point cloud map of a first camera, and a second depth map and a second point cloud map of a second camera;

S11: calculating a pixel position column difference, and indexing a pixel in the first point cloud map to obtain an indexed result; and S12: calculating the matching index of the pixels based on the indexed result and the pixel position column difference. The step S10 to the step S12 have the beneficial effects that: the indexed result is obtained by comparing the depth maps and the point cloud maps of two cameras and indexing the same, and the matching index of the pixels is calculated based on the indexed result, the matching degree of the pixels is obtained by calculating the depth maps and the point cloud maps of the two cameras with fewer calculating steps, low calculating complexity and simple calculating principle, and the speed of calculating the matching index of the pixels is improved.

Preferably, in the step S10, the first camera is a TOF camera, and the second camera is also a TOF camera. The TOF camera has the beneficial effects that the TOF camera mainly comprises a transmitting terminal and a receiving terminal, a ToF sensor transmits a light source driver chip modulation signal to a laser device to control the laser device to emit high-frequency modulated near-infrared light, and after the near-infrared light encounters an object for diffuse reflection, the receiving terminal calculates depth information through phase difference or time difference of transmitted light and received light. The ToF sensor adopts a back-illuminated CMOS process technology, the photosensitive area is greatly increased, a photon collection rate and the ranging speed are improved, the response time can reach the ns level, and high precision of the depth map may be guaranteed under a long-distance condition. A first depth image and a second depth image are directly obtained through two TOF cameras, thus the efficiency of the method for filtering out the anomalous pixel is improved.

Preferably, the first camera and the second camera are placed in parallel on a same horizontal plane, and the first depth map and the second depth map are obtained by shooting a same object by using the first camera and the second camera.

Preferably, in the step S10, the obtaining a first point cloud map and a second point cloud map comprises steps of:

S100: calibrating camera parameters, the camera parameters comprising a first camera intrinsic parameter and a second camera intrinsic parameter; and S101: performing calculating based on the first depth image and the first camera intrinsic parameter to obtain the first point cloud map, and performing calculating based on the second depth image and the second camera intrinsic parameter to obtain a middle point cloud map.

Further preferably, the obtaining a first point cloud map and a second point cloud map further comprises a step S102, the camera parameter further comprises a second camera extrinsic parameter, the step S102 comprises: performing translation and rotation on the middle point cloud map based on the second camera extrinsic parameter and by taking the center of the first point cloud map as the center of a coordinate system, thus obtaining the second point cloud map. The step S100 to the step S102 have the beneficial effects that the first point cloud map and the second point cloud map are calculated based on the camera parameters and the depth images, so that each pixel in the image can be conveniently distinguished, the matching index of the pixels can be conveniently calculated subsequently, the difficulty of calculating the anomalous pixel is simplified, and the efficiency of filtering out the anomalous pixel is improved.

Preferably, in the step S11, the indexing a pixel in the first point cloud map comprises: finding out a pixel in the second point cloud map corresponding to the pixel in the first point cloud map based on the pixel position column difference.

Preferably, in the step S11 the step of calculating a pixel position column difference comprises:

S110: calculating a baseline length and a pixel depth value; and

S111: multiplying the baseline length and a camera focal length together, and dividing a result thereof by the pixel depth value, thus obtaining the pixel position column difference.

Further preferably, the baseline length is a center-to-center spacing between a lens of the first camera and a lens of a second camera.

Further preferably, the pixel depth value is pixel depth of the first point cloud map, and the pixel depth of the first point cloud map is consistent with that of the second point cloud map.

Preferably, in the step S12, the calculating the matching index of the pixels based on the indexed result and the pixel position column difference comprises steps of:

S120: delineating a first window in the first point cloud map, and delineating a second window in the second point cloud map corresponding to the first window;

S121: respectively calculating point cloud values of all pixels in the first window and point cloud values of all pixels in the second window;

S122: subtracting the point cloud values of the pixels in the second window corresponding to the pixels in the first window from the point cloud values of the pixels in the first window to obtain cloud point differences, and calculating absolute values of the cloud point differences; and S123: summarizing the absolute values of the point cloud differences to obtain the matching index. The step S120 to the step S123 have the beneficial effects that: the first window is firstly delineated in the first point cloud, and then the corresponding second window is delineated in the second point cloud; the point cloud value of each pixel in the first window and the point cloud value of each pixel in the second wind are sequentially calculated, and then point cloud differences are obtained by subtracting the point cloud values of the corresponding pixels in the second window from the point cloud values of the pixels in the first window, the absolute values of the cloud point differences are calculated, and then the absolute values of the point cloud differences of all pixels are summarized to obtain the matching index of the pixels. Due to clear calculation logic and simple and clear calculating steps, the matching index of the pixels in the first window and the second window may be calculated faster, and the speed of finding out the anomalous pixel is improved.

Preferably, in the step S2, the finding out an anomalous pixel comprises: setting the correction threshold, and determining that the pixel is the anomalous pixel when judging that the matching index of the pixel is greater than or equal to the correction threshold;

and determining that the pixel is a normal pixel when judging that the matching index of the pixel is less than the correction threshold, and retaining the normal pixel. The step S2 has the beneficial effects that whether the pixel is the anomalous pixel or not is judged through the preset correction threshold, thus facilitating a subsequent correction operation to the anomalous pixel; the judgment mode is simple and effective, the efficiency of judging the anomalous pixel is improved, and the overall efficiency of correcting the anomalous pixel is improved.

Preferably, wherein in the step S3, the calculating a correction column difference and correcting the anomalous pixel based on the correction column difference and the matching index comprise steps of:

S30: calculating a plurality of correction column differences based on the pixel position column difference;

S31: calculating the matching index corresponding to each correction column difference;

S32: ranking the matching indexes to select a minimum matching index;

S33: calculating a corrected pixel depth value based on the correction column difference corresponding to the minimum matching index, and replacing the pixel depth value with the corrected pixel depth value; and S34: correcting the anomalous pixel based on the corrected pixel depth value, and replacing the anomalous pixel with the corrected pixel. The step S30 to the step S34 have the beneficial effects that a maximum matching index is found out by calculating the correction column difference through the pixel position column difference and then calculating the matching index of the pixels through the correction column difference; and then the corrected pixel depth value is calculated by using the correction column difference corresponding to the minimum matching index, the pixel depth value is replaced with the corrected pixel depth value, the anomalous pixel is corrected through the corrected pixel depth value, and the anomalous pixel is replaced with the corrected pixel, thus making a matching degree of the anomalous pixel with an original pixel be higher and completing the correction of the anomalous pixel. The integrity of the image is guaranteed by correcting the anomalous pixel rather than deleting the anomalous pixel, and the flying-spot noise at the edge of the image is retouched.

Preferably, the method further comprises a step S4: repeating the step S1 to the step S3 until all pixels in the first point cloud map are indexed.

The present invention further provides an apparatus, comprising a first camera, a second camera, an image processing unit, an indexing unit, a calculating unit, a judgment unit, and a correction execution unit, wherein the first camera is used for providing a first depth image, and the second camera is used for providing a second depth image;

the image processing unit is connected to the first camera and the second camera, and is used for processing the first depth image to obtain a first point cloud map and processing the second depth image to obtain a second point cloud map;

the calculating unit is connected to the image processing unit, and is used for calculating a pixel position column difference and a matching index of pixels;

the indexing unit is connected to the image processing unit and the calculating unit, and is used for indexing a pixel in the first point cloud map based on the pixel position column difference;

the judging unit is connected to the image processing unit and the calculating unit, and is used for judging whether the pixel is the anomalous pixel or not based on the matching index of the pixel and a correction threshold; and the correction execution unit is connected to the image processing unit and the judgment unit, and is used for correcting the anomalous pixel.

The apparatus provided by the present invention has the beneficial effects that the first depth map and the second depth map are provided by the first camera and the second camera, the image processing unit is used for processing the first depth map and the second depth map to obtain the first point cloud map and the second point cloud map, the calculating unit is used for calculating the pixel point column difference in the point cloud maps and the matching index of the pixels, the indexing unit is used for indexing the pixels in the point cloud maps, the judgment unit is used for judging whether the pixel is anomalous pixel or not, and the filtering execution unit is used for correcting the anomalous pixel. Various units of the apparatus are tightly connected, the anomalous pixel in the image can be quickly calculated and judged through cooperation and calculation among the cameras and the plurality of units, and the efficiency of correcting the anomalous pixel is improved.

Preferably, the apparatus further comprises a preset unit, the present unit is connected to the calculating unit and the judgment unit, and is used for presetting the correction threshold.

DESCRIPTION OF THE EMBODIMENTS

In order to make objectives, technical solutions, and advantages of the present invention clearer, the technical solutions in the present invention are described clearly and completely in the following with reference to accompanying drawings in the embodiments of the present invention. Apparently, the described embodiments are only part rather than all of the embodiments of the present invention, Based on the embodiments of the present invention, all the other embodiments obtained by those of ordinary skill in the art without creative efforts are within the scope of the present invention. Unless otherwise mentioned, all technical and scientific terms used herein have the same meaning as commonly understood by one of ordinary skill in the art to which the present invention belongs. As used herein, "comprising" and like words mean that elements or items appearing before the word encompass elements or items listed after the word and equivalents thereof, but do not exclude other elements or items.

For the problem existing in the prior art, an embodiment of the present invention provides a method for correcting an anomalous pixel and an apparatus.

For the problem existing in the prior art, an embodiment of the present invention provides a method for filtering out an anomalous pixel and an apparatus.

Figure 1:
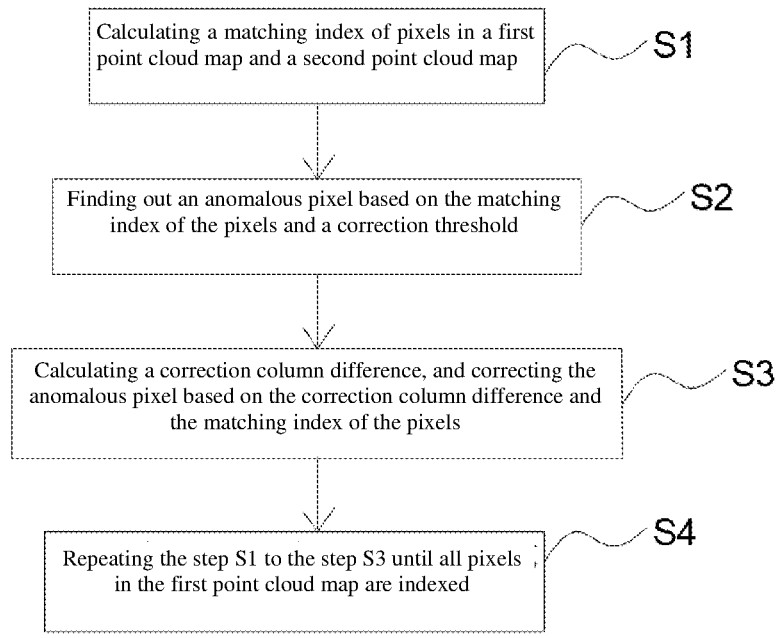
FIG. 1 is a flow diagram of a method for correcting an anomalous pixel in accordance with the present invention.

FIG. 1 is a flow diagram of a method for correcting an anomalous pixel in accordance with the present invention. Referring to FIG. 1, a method for correcting an anomalous pixel in accordance with the present invention comprises steps of:

S1: calculating a matching index of pixels in a first point cloud map and a second point cloud map;

S2: finding out an anomalous pixel based on the matching index of the pixels and a correction threshold;

S3: calculating a correction column difference, and correcting the anomalous pixel based on the correction column difference and the matching index of the pixels; and S4: repeating step S1 to step S3 until all pixels in the first point cloud map are indexed.

The method for correcting the anomalous pixel provided by the present invention has the advantages that:

the matching index of the pixels in the first point cloud map and the second point cloud map is calculated; the anomalous pixel is found out based on the matching index of the pixels and the correction threshold; then the correction column difference is calculated, and the anomalous pixel is corrected based on the correction column difference and the matching index of the pixels, thus retaining the anomalous pixel in the point cloud map; the anomalous pixel is corrected to guarantee the pixel integrity of an image, and the calculation mode is simple, requires fewer calculating steps, and exhibits high anomalous pixel correction efficiency.

Figure 2:
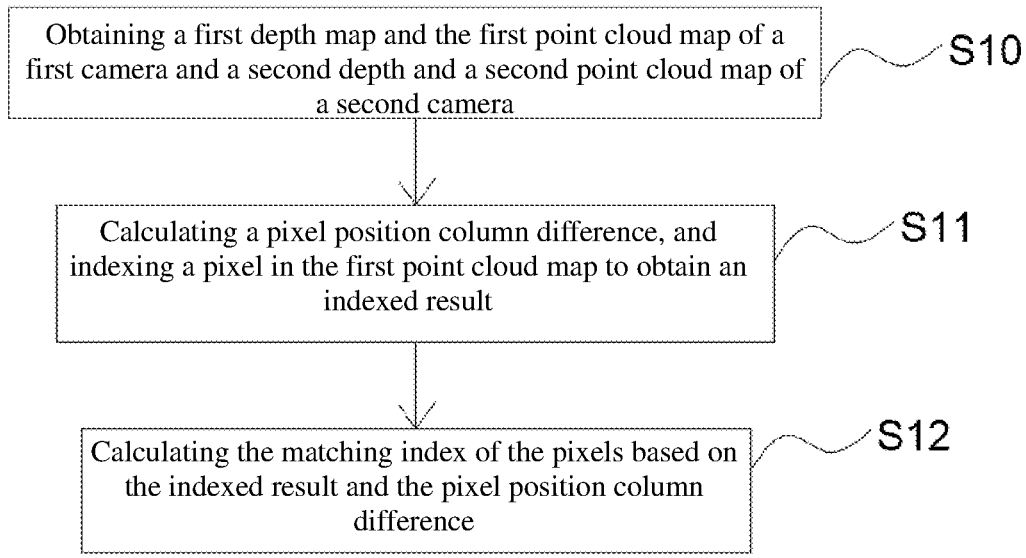
FIG. 2 is a flow diagram of calculating a matching index of pixels in a first point cloud map and a second point cloud map in accordance with the present invention.

As a preferred embodiment of the present invention, in the step S1, FIG. 2 is a flow diagram of calculating a matching index of pixels in a first point cloud map and a second point cloud map in accordance with the present invention. Referring to FIG. 2, the calculating a matching index of the pixels in a first point cloud map and a second point cloud map comprises steps of:

S10: obtaining a first depth map and a first point cloud map of a first camera, and a second depth map and a second point cloud map of a second camera;

S11: calculating a pixel position column, indexing a pixel in the first point cloud map to obtain an indexed result; and S12: calculating the matching index of the pixels based on the indexed result and the pixel position column difference. The step S10 to the step S12 have the advantages that the indexed result is obtained by comparing and the depth maps and the point cloud maps of two cameras and indexing the same, and the matching index of the pixels is calculated based on the indexed result, the matching degree of the pixels is obtained by calculating the depth maps and the point cloud maps of the two cameras with fewer calculating steps, low calculating complexity, and simple calculating principle, and a speed of calculating the matching index of the pixels is improved.

As a preferred embodiment of the present invention, in the step S10, the first camera is a TOF camera, and the second camera is also a TOF camera. The TOF camera has the advantages that the TOF camera mainly comprises a transmitting terminal and a receiving terminal, a ToF sensor transmits a light source driver chip modulation signal to a laser device to control the laser device to emit high-frequency modulated near-infrared light, and after the near-infrared light encounters an object for diffuse reflection, the receiving terminal calculates depth information through phase difference or time difference of transmitted light and received light. The ToF sensor adopts a back-illuminated CMOS process technology, the photosensitive area is greatly increased, a photon collection rate and the ranging speed are improved, the response time can reach the ns level, and high precision of the depth map can be guaranteed under a long-distance condition. A first depth image and a second depth image are directly obtained by two TOF cameras, thus the efficiency of the method for filtering out the anomalous pixel is improved.

As a preferred embodiment of the present invention, the first camera and the second camera are placed in parallel on a same horizontal plane, and the first depth image and the second depth image are obtained by shooting a same object by using the first camera and the second cam era.

Figure 3:
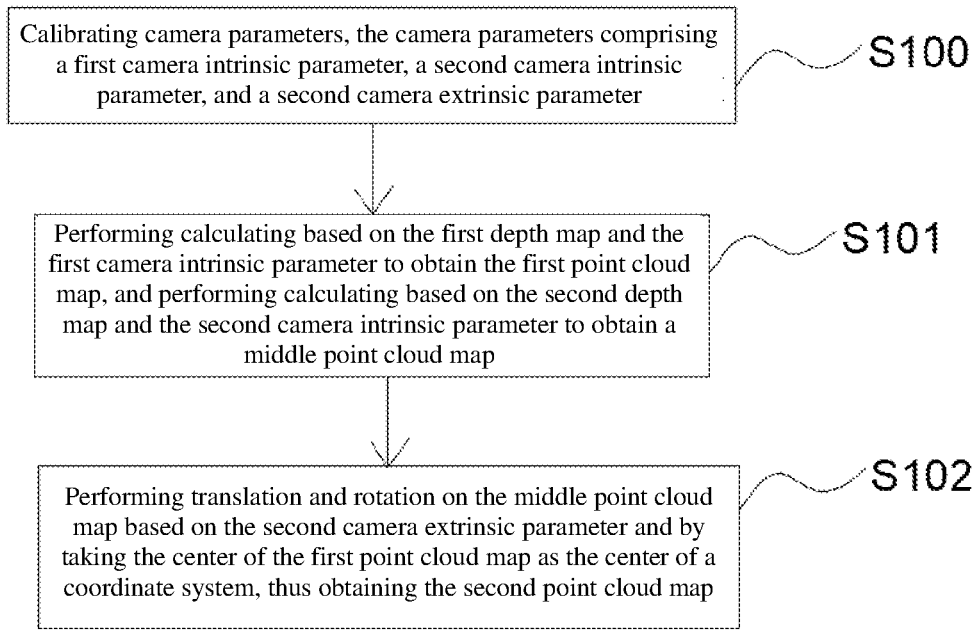
FIG. 3 is a flow diagram of processing a first depth image in accordance with the present invention.

As a preferred embodiment of the present invention, in the step S10, FIG. 3 is a flow diagram of processing a first depth image in accordance with the present invention. Referring to FIG. 3, the obtaining the first point cloud map and the second point cloud map comprises:

S100: calibrating camera parameters, the camera parameters comprising a first camera intrinsic parameter and a second camera intrinsic parameter; and S101: performing calculating based on the first depth map and the first camera intrinsic parameter to obtain the first point cloud map, and performing calculating based on the second depth map and the second camera intrinsic parameter to obtain a middle point cloud map.

As a preferred embodiment of the present invention, the obtaining the first point cloud map and the second point cloud map comprises further comprises a step S102, the camera parameters further comprise a second camera extrinsic parameter, the step S102 comprises: performing translation and rotation on the middle point cloud map based on the second camera extrinsic parameter and by taking the center of the first point cloud map as the center of a coordinate system, thus obtaining the second point cloud map. The step S100 to the step S102 have the advantages that the first point cloud map and the second point cloud map are obtained by calculating based on the camera parameters and the depth images, so that each pixel in the image can be conveniently distinguished, the matching index of the pixels can be conveniently calculated subsequently, the difficulty of calculating the anomalous pixel is simplified, and the efficiency of filtering the anomalous pixel is improved.

As a preferred embodiment of the present invention, in the step S11, the indexing a pixel in the first point cloud map comprises finding out a pixel in the second point cloud map corresponding to the pixel in the first point cloud map based on the pixel position column difference.

Figure 4:
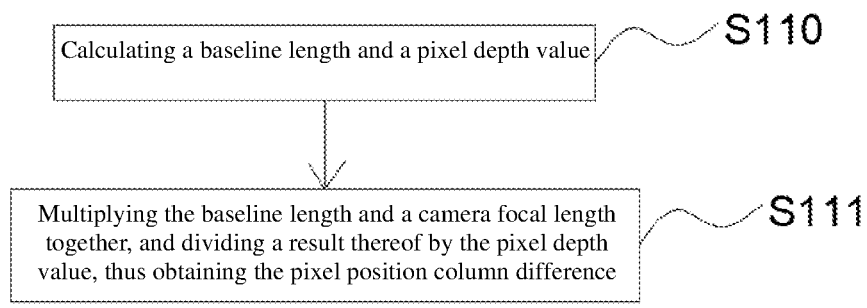
FIG. 4 is a flow diagram of calculating a pixel position column difference in accordance with the present invention.

As a preferred embodiment of the present invention, in the step S11, FIG. 4 is a flow diagram of calculating a pixel position column difference in accordance with the present invention. Referring to FIG. 4, the step of calculating the pixel position column difference comprises:

S110: calculating a baseline length and a pixel depth value; and

S111: multiplying the baseline length and a camera focal length together, and dividing a result thereof by the pixel depth value, thus obtaining the pixel position column difference.

As a specific embodiment of the present invention, a calculation formula of the pixel position column difference is provided, which is as follows:

$$d = \frac{B * f}{Z} \qquad (1)$$

Wherein d is the pixel position column difference; B is the baseline length; f is the camera focal length; and Z is the pixel depth value.

As a preferred embodiment of the present invention, the baseline length is a center-to-center spacing between a lens of the first camera and a lens of the second camera.

As a preferred embodiment of the present invention, the pixel depth value is pixel depth of the first point cloud map, and the pixel depth of the first point cloud map is consistent with that of the second point cloud map.

Figure 5:
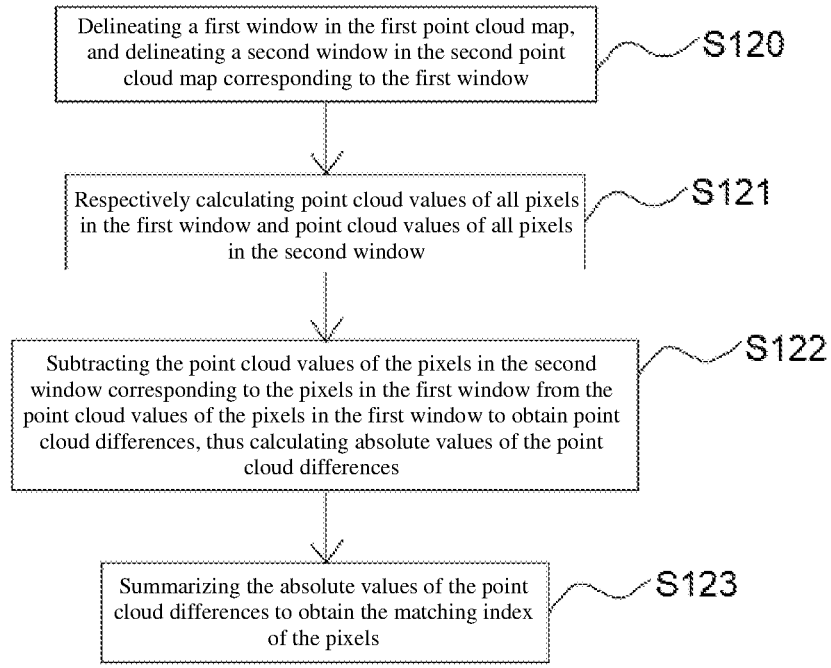
FIG. 5 is a flow diagram of calculating a matching index of pixels in accordance with the present invention.

As a preferred embodiment of the present invention, in the step S12, FIG. 5 is a flow diagram of calculating a matching index of pixels in accordance with the present invention. Referring to FIG. 5, the calculating the matching index of the pixels based on the indexed result and the pixel point column difference comprises:

S120: delineating a first window in the first point cloud map, and delineating a second window in the second point cloud map corresponding to the first window; specifically, finding out the second window in the second point cloud map corresponding to the first window based on the indexing flow in the step S11;

S121: respectively calculating point cloud values of all pixels in the first window and point cloud values of all pixels in the second window;

S122: subtracting the point cloud values of the pixels in the second window corresponding to the pixels in the first window from the point cloud values of the pixels in the first window to obtain point cloud differences, and calculating absolute values of the point cloud differences; and S123: summarizing the absolute values of the point cloud differences to obtain the matching index. The step S120 to the step S123 have the advantages that: the first window is firstly delineated in the first point cloud, and then the corresponding second window is delineated in the second point cloud; the point cloud value of each pixel in the first window and the point cloud value of each pixel in the second wind are sequentially calculated, and then point cloud differences are obtained by subtracting the point cloud values of the corresponding pixels in the second window from the point cloud values of the pixels in the first window, the absolute values of the cloud point differences are calculated, and then the absolute values of the point cloud differences of all pixels are summarized to obtain the matching index of the pixels. Due to clear calculation logic and simple and clear calculating step, the matching index of the pixels in the first window and the second window can be calculated faster, and the speed of finding out the anomalous pixel is improved.

As a specific embodiment of the present invention, a calculation formula of the matching index of the pixels is further provided, which is as follows:

$$f(x, y, d) = \sum_{dx,dy=0}^{M} |PCL1(x+dx, y+dy) - PCL2'(x+dx-d, y+dy)| \quad ②$$

wherein f(x, y, d) is the matching index of the pixels, M is the magnitude of the first window or the second window, x is an abscissa of the pixel, y is an ordinate of the pixel, d is the pixel position column difference PCL1(x+dx, y+dy), y is the point cloud value of the pixel of the first window, and PCL2'(x+dx−d, y+dy) is the point cloud value of the pixel of the second window.

It should be noted that the magnitude M of the first window is adjustable, the magnitude M of the first window may be 2, indicating that there are 3*3=9 pixels in the first window. The second window corresponds to the first window, and thus the magnitude of the second window is consistent with that of the first window.

As a preferred embodiment of the present invention, in the step S2, the finding out an anomalous pixel comprises: setting the correction threshold; determining that the pixel is the anomalous pixel when judging that the matching index of the pixel is greater than or equal to the correction threshold; and determining that the pixel is a normal pixel when judging that the matching index of the pixel is less than the correction threshold, and retaining the normal pixel. The step S2 has the advantages that whether the pixel is the anomalous pixel or not is judged through the preset correction threshold, thus facilitating a subsequent correction operation to the anomalous pixel; the judgment mode is simple and effective, the efficiency of judging the anomalous pixel is improved, and the overall efficiency of correcting the anomalous pixel is improved.

Figure 6:
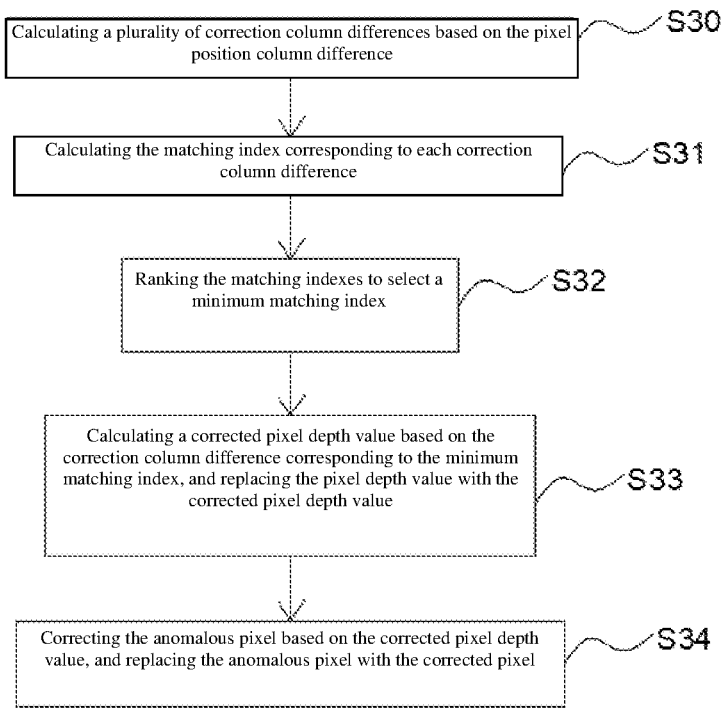
FIG. 6 is a flow diagram of correcting an anomalous pixel in accordance with the present invention.

As a preferred embodiment of the present invention, wherein in the step S3, FIG. 6 is a flow diagram of correcting an anomalous pixel in accordance with the present invention. Referring to FIG. 6, the calculating the correction column difference and correcting the anomalous pixel based on the correction column difference and the matching index comprise steps of:

S30: calculating a plurality of correction column differences based on the pixel position column difference;

S31: calculating the matching index corresponding to each correction column difference;

S32: ranking the matching indexes to select a minimum matching index;

S33: calculating a corrected pixel depth value based on the correction column difference corresponding to the minimum matching index, and replacing the pixel depth value with the corrected pixel depth value; and S34: correcting the anomalous pixel based on the corrected pixel depth value, and replacing the anomalous pixel with the corrected pixel. The step S30 to the step S34 have advantages that a maximum matching index is found out by calculating the correction column difference through the pixel position column difference and then calculating the matching index of the pixel based on the correction column difference; and then the correction pixel depth value is calculated by using the correction column difference corresponding to the minimum matching index, the pixel depth value is replaced with the correction pixel depth value, the anomalous pixel is corrected through the correction pixel depth value, and the anomalous pixel is replaced with the corrected pixel, thus making the matching degree of the anomalous pixel with the original pixel be higher and completing the correction of the anomalous pixel. The integrity of the image is guaranteed by correcting the anomalous pixel rather than deleting the anomalous pixel, and the flying-spot noise at the edge of the image is retouched.

As a specific embodiment of the present invention, a specific step of correcting the anomalous pixel comprises:
setting the plurality of correction column differences as δ d1=0×d, δ d2=0×d . . . δ dn=n×d (n is a positive integer);
then sequentially substituting the plurality of correction column differences into the calculation formula of the matching index of the pixels respectively, respectively substituting δ d$_1$, δ d$_2$ . . . δd$_n$ into the formula ②, performing calculation to obtain the matching indexes corresponding to the plurality of correction column differences, i.e., performing calculation to obtain f(x, y, δ d$_1$), f(x, y, δ d$_2$) . . . f(x, y, δ d$_n$);
ranking the f(x, y, δ d$_1$), f(x, y, δ d$_2$) . . . f(x, y, δ d$_n$) to find the maximum matching index, and finding out δ d corresponding to the maximum matching index, wherein the δ d is the optimal correction column difference d$_{min}$;
wherein the depth value formula of the pixel can be obtained through the formula pixel position column difference formula $$d = \frac{B \times f}{Z},$$

the depth value formula of the pixel is as follows:

$$Z = \frac{B \times f}{d}$$

substituting the optimal correction column difference d$_{min}$ into the depth value formula of the pixel to obtain $$Z' = \frac{B \times f}{d_{min}},$$

and replacing the pixel depth value Z with the corrected pixel depth value Z'; and
correcting the anomalous pixel using the corrected pixel depth value Z', and then replacing the anomalous pixel with the corrected pixel.

It should be noted that n may be adjusted along with the value of f(x, y, d), the greater the f(x, y, d) value is, the greater the n value is. In some embodiments, the n value may be set as 3.

Figure 7:
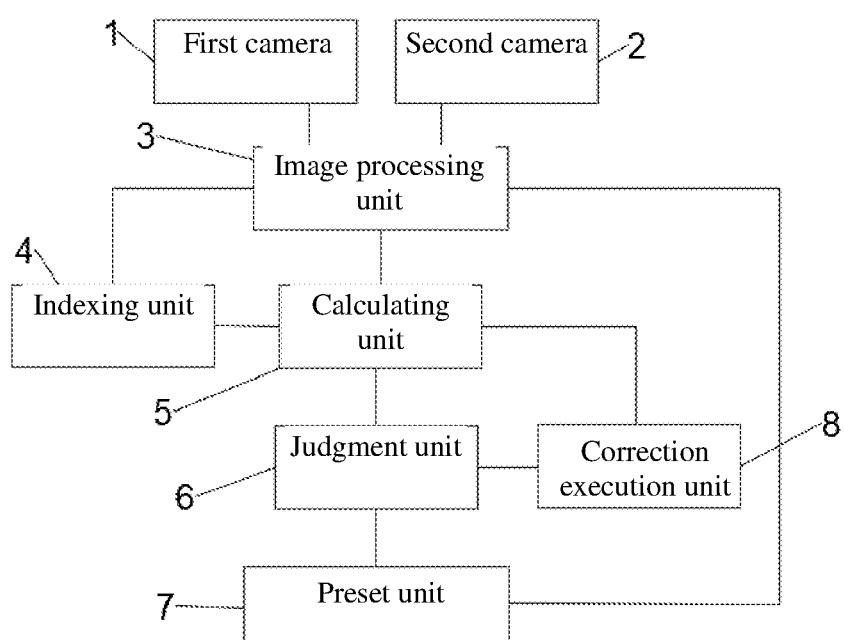
FIG. 7 is a structure diagram of an apparatus in accordance with the present invention.

The present invention further provides an apparatus, FIG. 7 is a structural diagram of an apparatus in accordance with the present invention. Referring to FIG. 7, the apparatus of the present invention comprises a first camera 1, a second camera 2, an image processing unit 3, an indexing unit 4, a calculating unit 5, a judgment unit 6, and a correction execution unit 7, wherein the first camera 1 is used for providing a first depth image, and the second camera 2 is used for providing a second depth image;

the image processing unit 3 is connected to the first camera 1 and the second camera 2, and is used for processing the first depth image to obtain a first point cloud map, and processing the second depth image to obtain a second point cloud map;

the calculating unit 5 is connected to the image processing unit 3, and is used for calculating a pixel position column difference and a matching index of the pixels;

as a specific embodiment of the present invention, the calculating unit 5 is used for calculating the pixel position column difference through a pixel position column difference formula, the pixel position column difference formula being as follows:

$$d = \frac{B \times f}{Z}$$

wherein d is the pixel position column difference; B is a baseline length; f is a camera focal length; and Z is a pixel depth value.

As a specific embodiment of the present invention, specifically, the calculating unit 5 is used for calculating the matching index of the pixels through the matching index formula of the pixel, and the matching index formula of the pixel is:

$$f(x, y, d) = \sum_{dx,dy=0}^{M} |PCL1(x+dx, y+dy) - PCL2'(x+dx-d, y+dy)|$$

wherein f(x, y, d) is the matching index of the pixels, M is a magnitude of the first window and the second window, x is an abscissa of the pixel, y is an ordinate of the pixel, d is the pixel position column difference, PCL1(x+dx, y+dy) is a point cloud value of the pixel of a first window, and PCL2'(x+dx−d, y+dy) is a point cloud value of the pixel of a second window.

The indexing unit 4 is connected to the image processing unit 3 and the calculating unit 5, and is used for indexing a pixel in the first point cloud map based on the pixel position column difference;

while calculating the matching index of the pixels, the indexing unit 4 is further used for indexing the second window in the second point cloud map corresponding to the first window.

The judgment unit 6 is connected to the calculating unit 5, and is used for judging whether the pixel is the anomalous pixel or not based on the matching index of the pixel and a correction threshold.

Specifically, when the judgment unit 6 judges that the matching index of the pixel is greater than or equal to the correction threshold, the pixel with the matching index greater than the correction threshold is the anomalous pixel; and when the judgment unit 6 judges that the matching index of the pixel is less than the correction threshold, the pixel is judged to not meet a correction condition, the pixel is the normal pixel at the moment, no correction is required, and the normal pixel is retained.

The correction execution unit 7 is connected to the image processing unit 3 and the judgment unit 6, after the anomalous pixel in the first point cloud map is selected by the judgment unit 6, the correction execution unit 7 is used for correcting the anomalous pixel in the first point cloud map.

The apparatus disclosed by the present invention has the advantages that the first depth map and the second depth map are provided by the first camera and the second camera, the image processing unit is used for processing the first depth map and the second depth map to obtain the first point cloud map and the second point cloud map, the calculating unit is used for calculating the pixel point column difference in the point cloud maps and the matching index of the pixels, the indexing unit is used for indexing the pixels in the point cloud maps, the judgment unit is used for judging whether the pixel is anomalous pixel or not, and the filtering execution unit is used for correcting the anomalous pixel. Various units of the apparatus are tightly connected, the anomalous pixel in the image is quickly calculated and judged through cooperation and calculation among the cameras and the plurality of units, and the efficiency of correcting the anomalous pixel is improved.

As a preferred embodiment of the present invention, referring to FIG. 7, the apparatus further comprises a preset unit 8, the present unit 8 is connected to the calculating unit 5 and the judgment unit 6, and is used for presetting the correction threshold.

The preset unit 8 is further used for calibrating camera parameters, the camera parameters comprise a first camera intrinsic parameter, a second camera intrinsic parameter, and a second camera extrinsic parameter. After the preset unit 8 sends the camera parameters to the calculating unit 5, the calculating unit 5 is used for performing calculation based on the first depth image and the first camera intrinsic parameter to obtain the first point cloud map, and performing calculation based on the second depth image and the second camera intrinsic parameter to obtain a middle point cloud map. Then the calculating unit 5 is used for performing translation and rotation on the middle point cloud map based on the second camera extrinsic parameter and by taking the center of the first point cloud map as the center of a coordinate system, thus obtaining the second point cloud map.

While the embodiments of the present invention have been described in detail, it will be apparent to those skilled in the art that various modifications and changes can be made to the embodiments. However, it should be understood that such modifications and variations are within the scope and spirit of the present invention as described in the appended claims. Furthermore, the present invention described herein is susceptible to other embodiments and may be embodied or carried out in various ways.

What is claimed is:

1. A method for correcting an anomalous pixel, the method comprising:
    S1: calculating a matching index of pixels in a first point cloud map and a second point cloud map;
    S2: finding out an anomalous pixel based on the matching index of the pixels and a correction threshold; and
    S3: calculating a correction column difference, and correcting the anomalous pixel based on the correction column difference and the matching index of the pixels;
    wherein in the step S1, the calculating a matching index of pixels in a first point cloud map and a second point cloud map comprises steps of:

S10: obtaining a first depth map and a first point cloud map of a first camera, and a second depth map and a second point cloud map of a second camera;

S11: calculating a pixel position column difference, and indexing a pixel in the first point cloud map to obtain an indexed result; and S12: calculating the matching index of the pixels based on the indexed result and the pixel position column difference;

wherein in the step S12, the calculating the matching index of the pixels based on the indexed result and the pixel position column difference comprises steps of:

S120: delineating a first window in the first point cloud map, and delineating a second window in the second point cloud map corresponding to the first window;

S121: respectively calculating point cloud values of all pixels in the first window and point cloud values of all pixels in the second window;

S122: subtracting the point cloud values of the pixels in the second window corresponding to the pixels in the first window from the point cloud values of the pixels in the first window to obtain point cloud differences, and calculating absolute values of the point cloud differences; and S123: summarizing the absolute values of the point cloud differences to obtain the matching index.

2. The method for correcting an anomalous pixel according to claim 1, wherein in the step S10, the first camera is a time of fight camera, and the second camera is a time of fight camera.

3. The method for correcting an anomalous pixel according to claim 1, wherein the first camera and the second camera are placed in parallel on a same horizontal plane, and the first depth image and the second depth image are obtained by shooting a same object by using the first camera and the second camera.

4. The method for correcting an anomalous pixel according to claim 1, wherein in the step S10, the obtaining a first point cloud map and a second point cloud map comprises steps of:

S100: calibrating camera parameters, the camera parameters comprising a first camera intrinsic parameter and a second camera intrinsic parameter; and S101: performing calculating based on the first depth image and the first camera intrinsic parameter to obtain the first point cloud map, and performing calculating based on the second depth image and the second camera intrinsic parameter to obtain a middle point cloud map.

5. The method for correcting an anomalous pixel according to claim 4, wherein the obtaining a first point cloud map and a second point cloud map further comprises a step S102, the camera parameters further comprise a second camera extrinsic parameter, the step S102 comprises: performing translation and rotation on the middle point cloud map based on the second camera extrinsic parameter and by taking the center of the first point cloud map as the center of a coordinate system, thus obtaining the second point cloud map.

6. The method for correcting an anomalous pixel according to claim 1, wherein in the step S11, the indexing a pixel in the first point cloud map comprises: finding out the pixel in the second point cloud map corresponding to the pixel in the first point cloud map based on the pixel position column difference.

7. The method for correcting an anomalous pixel according to claim 1, wherein in the step S11, the step of calculating the pixel position column difference comprises:

S110: calculating a baseline length and a pixel depth value; and

S111: multiplying the baseline length and a camera focal length together, and then dividing a result thereof by the pixel depth value, thus obtaining the pixel position column difference.

8. The method for correcting an anomalous pixel according to claim 7, wherein the baseline length is a center-to-center spacing between a lens of the first camera and a lens of the second camera.

9. The method for correcting an anomalous pixel according to claim 7, wherein the pixel depth value is pixel depth of the first point cloud map, and the pixel depth of the first point cloud map is consistent with that of the second point cloud map.

10. The method for correcting an anomalous pixel according to claim 1, wherein in the step S2, the finding out an anomalous pixel comprises: setting the correction threshold; determining that the pixel is the anomalous pixel when judging that the matching index of the pixel is greater than or equal to the correction threshold; and determining that the pixel is a normal pixel when the matching index of the pixel is less than the correction threshold, and retaining the normal pixel.

11. The method for correcting an anomalous pixel according to claim 1, wherein in the step S3, the calculating a correction column difference and correcting the anomalous pixel based on the correction column difference and the matching index comprise steps of:

S30: calculating a plurality of correction column differences based on the pixel position column difference;

S31: calculating the matching index corresponding to each correction column difference;

S32: ranking the matching indexes to select a minimum matching index;

S33: calculating a corrected pixel depth value based on the correction column difference corresponding to the minimum matching index, and replacing the pixel depth value with the corrected pixel depth value; and S34: correcting the anomalous pixel based on the corrected pixel depth value, and replacing the anomalous pixel with the corrected pixel.

12. The method for correcting an anomalous pixel according to claim 1, wherein the method further comprises a step S4: repeating the step S1 to the step S3 until all pixels in the first point cloud map are indexed.

13. An apparatus, comprising a first camera, a second camera, an image processing unit, an indexing unit, a calculating unit, a judgment unit, and a correction execution unit, wherein the first camera is used for providing a first depth image, and the second camera is used for providing a second depth image;

the image processing unit is connected to the first camera and the second camera, and is used for processing the first depth image to obtain a first point cloud map and processing the second depth image to obtain a second point cloud map;

the calculating unit is connected to the image processing unit, and is used for calculating a pixel position column difference and a matching index of pixels;

the indexing unit is connected to the image processing unit and the calculating unit, and is used for indexing a pixel in the first point cloud map based on the pixel position column difference;

the calculating unit is used for obtaining a first depth map and a first point cloud map of a first camera, and a second depth map and a second point cloud map of a second camera; for calculating a pixel position column difference, and indexing a pixel in the first point cloud map to obtain an indexed result; and for calculating the matching index of the pixels based on the indexed result and the pixel position column difference;

the calculating unit is used for delineating a first window in the first point cloud map, and delineating a second window in the second point cloud map corresponding to the first window; for respectively calculating point cloud values of all pixels in the first window and point cloud values of all pixels in the second window; for subtracting the point cloud values of the pixels in the second window corresponding to the pixels in the first window from the point cloud values of the pixels in the first window to obtain point cloud differences, and calculating absolute values of the point cloud differences; and for summarizing the absolute values of the point cloud differences to obtain the matching index;

the judgment unit is connected to the calculating unit, and is used for judging whether the pixel is an anomalous pixel or not based on the matching index of the pixel and a correction threshold; and the correction execution unit is connected to the judgment unit and the image processing unit, and is used for correcting the anomalous pixel.

14. The apparatus according to claim 13, further comprising a preset unit, wherein the preset unit is connected to the calculating unit and the judgment unit, and is used for presetting the correction threshold.

\* \* \* \* \*